Patented May 31, 1949

2,471,824

UNITED STATES PATENT OFFICE 2,471,824

RECOVERY OF SILVER FROM RESIDUES CONTAINING THE SAME

Herman A. Liebhafsky and Lester B. Bronk, Schenectady, N. Y., assignors to General Electric Company, a corporation of New York No Drawing. Application August 7, 1946, Serial No. 688,968

7 Claims. (Cl. 23—87)

The present invention relates to a process for the recovery of silver or silver compound from a contact mass employed in the preparation of organo-substituted halogenosilanes and is concerned with a process for recovering silver (present in the free or combined state) in the form of silver nitrate from a contact mass comprising (a) silicon and (b) a composition or material selected from the class consisting of metallic silver, silver halides, and mixtures of silver and silver halides over which mass there has been passed a hydrocarbon halide, (e. g., an alkyl halide, such as, for instance, methyl chloride, methyl bromide, ethyl chloride, etc.; an aryl halide, e. g., chlorobenzene, bromobenzene, etc.; an aralkyl halide, e. g., benzyl chloride, etc.; an alkaryl halide, e, g., tolyl chloride, etc.) at an elevated temperature, e. g., above 250° C. More particularly, the process of the instant invention comprises firing the residue resulting from the passage at an elevated temperature of the hydrocarbon halide over the contact mass, the firing being effected in a nonoxidizing atmosphere at a temperature above 600° C., and thereafter treating the fired residue with strong nitric acid (e. g., an aqueous nitric acid solution having a specific gravity of from about 1.1 to 1.5, preferably from about 1.3 to 1.45) and recovering the silver nitrate thus formed. The term "silver," as used throughout the specification and claims in conjunction with the aforementioned residue, is intended to refer to silver, either in the free state, e. g., metallic silver, or in the combined state, e. g., as the silver halide, etc.

Metallic silver and silver chloride (or mixtures of the two) are capable of accelerating the reaction between a hydrocarbon halide and silicon at elevated temperatures to yield hydrocarbonsubstituted halogenosilanes. In this connection it is believed that when a silver halide is employed in the contact mass, reducing elements present in the reaction, e. g., the silicon, will reduce the silver halide to metallic silver. The use of metallic silver as a catalyst for the above-described reaction is more fully disclosed and claimed in Rochow Patent U. S. 2,380,995 assigned to the same assignee as the present invention. The preparation of contact masses comprising, e. g., silicon and silver, is more fully disclosed and claimed in Patnode Patent U. S. 2,380,997, issued August 7, 1945, and assigned to the same assignee as the present invention. Metallic silver as a catalyst is especially desirable in the case of the preparation of aryl halogenosilanes, e. g., phenyl chlorosilanes resulting from the reaction of chlorobenzene and the silicon in, for example, the silver-silicon contact mass. The yields of aryl halogenosilanes obtained by using silver as a catalyst are usually better than those obtained by using other metallic catalysts. Since metallic silver and silver halides are quite expensive, it is highly desirable that the silver and silver halides employed in the above-described reaction be recovered as economically and as easily as possible so that they may be used in later synthesis of organo-substituted halogenosilanes.

Many attempts have been made to recover completely the silver (whether in the form of free silver or in a combined form, e. g., as a silver halide) from the residue resulting from the passage of a hydrocarbon halide over the aforementioned contact mass. However, heretofore, the usual methods employed for recovering silver from such residues have resulted in unsatisfactory recoveries of the silver from the residue. For example, one of the approved methods for recovering metallic silver from masses containing the same comprises treating the silver-containing mass with nitric acid to convert the silver to silver nitrate. However, when the residue obtained after passage of the hydrocarbon halide over the contact mass comprising, for instance, silicon and silver is treated with strong nitric acid, the recovery of the silver (as silver nitrate) contained in the said residue is very small, rarely exceeding more than about one-half of the amount of silver contained therein.

Assuming that the silver in the residue is present in the form of a silver halide, for example, as silver chloride, it would be expected that the usual chemical methods for recovering the silver halide would extract the silver from the residue. Thus, when the aforementioned residue (after passage of the hydrocarbon halide thereover) is treated with potassium cyanide, there is a substantially incomplete recovery of any silver chloride present in the residue, the amount recovered rarely exceeding one-quarter of that present in the residue. It is, therefore, apparent that two of the usual methods for recovering silver from the above-described residue are entirely inadequate for the purpose, and that considerable loss would occur if only partial recovery of the silver present, for instance, as free silver or as a silver halide, could be had from the residue.

We have now discovered that the silver contained in a residue resulting from the passage of a hydrocarbon halide at elevated temperatures over a contact mass comprising silicon and a material selected from the class consisting of silver, a silver halide and mixtures of silver and a silver halide, may be recovered in an almost quantitative yield, in the form of silver nitrate, if the aforementioned residue is first fired at a temperature above 600° C. in an atmosphere free of oxidizing agents. According to our invention, when the residue is thus fired, the silver can be extracted from the residue almost quantitatively in the form of silver nitrate by thereafter treating the said fired mass with strong nitric acid and, if desired, isolating the silver nitrate from the mixture comprising nitric acid and the fired residue. By our method, any silver in the residue, whether in the free or combined state can now be dissolved in strong nitric acid by immersing the fired residue in the nitric acid and, preferably, though not essentially, heating the mixture.

The manner whereby the above-described results are obtained is not clearly understood. It was originally believed that the elevated temperatures (e. g., 250° to 600° C.) at which the reaction between the hydrocarbon halide and the silver-silicon contact mass (or silver halide-silicon contact mass) was effected, caused a change in the chemical or physical structure of the silver or silver halide present therein. To test this possibility, metallic silver was freshly prepared by precipitating the same and conducting the following test: About 90 parts powdered silicon and 10 parts of the freshly precipitated silver were mixed together to form a contact mass which was fired in a hydrogen atmosphere at 900° C. for 45 minutes; thereafter the mass was broken into small particles. Substantially all the silver contained in the fired mass was recovered as silver nitrate when the fired mass was treated with concentrated nitric acid to extract the silver in the form of silver nitrate. This indicated that the temperature conditions at which the firing of the mixture of powders occurred were not the cause of converting the metallic silver to a relatively nitric-acid-insoluble form.

Assuming that the silver contained in the contact mass was converted to silver chloride by the passage of the hydrocarbon chloride during the reaction, it was decided to determine whether the elevated temperatures caused the silver chloride to convert to a form which rendered it difficult to extract the silver chloride by an approved method, namely, by the cyanide method. For this purpose, freshly precipitated silver chloride was divided into two portions. One portion was fused at a temperature of about 450° C. (the temperature at which the reaction between the hydrocarbon chloride and the silicon in the silver-silicon contact mass often is caused to take place) while the other portion remained unfused. Each portion was then immersed in a 10 per cent aqueous potassium cyanide solution. Both portions dissolved readily in the solution indicating that the elevated temperatures encountered in the aforementioned reaction were not the sole cause of the complication whereby neither nitric acid nor potassium cyanide, which are approved methods for recovering silver and silver chloride, respectively, could extract the silver or silver chloride.

In order that those skilled in the art may fully understand the manner in which this invention may be practiced, the following examples are given by way of illustration and not by way of limitation. All parts are by weight.

*Example 1*

About 10 parts silver powder and 90 parts silicon powder were thoroughly mixed together and fired at 900° C. for 45 minutes in a hydrogen atmosphere. The mass was thereafter broken into small pieces and packed into a reaction tube. Chlorobenzene was passed through the tube for about 408 hours at a temperature of from about 375° to 520° C. to yield a reaction product comprising a mixture of phenyl chlorosilanes. The residue in the tube comprising the silver-silicon contact mass over which the chlorobenzene had passed was removed and subjected to the following test:

(a) Ten parts of the above residue were fired for six hours in a hydrogen atmosphere at 600° C. Thereafter, the silver contained in the fired residue was extracted twice with concentrated nitric acid. When the two extracts were combined and titrated with standard ammonium thiocyanate solution using ferric alum as the indicator, it was calculated that substantially all of the silver (present either in the uncombined form, e. g., as metallic silver, or in the combined form, e. g., silver chloride) was recovered from the residue.

(b) Another sample of the above-obtained residue was digested in concentrated nitric acid by refluxing the same for about 12 hours (omitting the firing step employed in (a) above). Filtration and titration of the filtrate by the above-described thiocyanate method failed to disclose even a trace of silver nitrate. Treatment of a sample of the above-obtained residue (omitting the heat-treatment and nitric acid treatment) with about 10 parts of a 10 per cent aqueous potassium cyanide solution on a steam bath, resulted in the extraction of only approximately one-fifth of the silver (in whatever state it existed) contained in the residue.

Note.—In the above tests and the tests which follow, the extraction of the residues was conducted as follows: One part of the powdered residue and about 21 parts concentrated nitric acid (specific gravity 1.4) were heated on a hot plate at 200° C. for about 10 minutes. The mixture was then centrifuged, and the residue washed with water, the acid and washings being combined. Other successive extractions were carried out similarly.

*Example 2*

The residue obtained in Example 1 as a result of the passage of chlorobenzene over the silver-silicon contact mass was fired at about 600° C. for approximately 15 hours in a nitrogen atmosphere. Substantially all the silver contained in the residue was recovered by the nitric acid extraction method employed in part (a) of Example 1.

*Example 3*

Firing in air of the residue resulting from the passage of chlorobenzene over the silver-silicon mass (see Example 1) resulted in the recovery of approximately only one-quarter of the silver present in the said residue.

It is to be understood that other inert atmospheres and firing temperatures may be employed in addition to those used in the foregoing examples. Thus, we may use temperatures as high as 1500° C. for firing the residue in the non-oxidizing atmosphere. However, we have found that it is seldom necessary to fire the residue in the atmosphere free of oxidizing agents at a temperature much above 1000° C. The time for firing these residues, although it is not critical, may also be varied, e. g., from about 3 to 24 hours, preferably from about 6 to 18 hours, depending e. g., on the composition of the residue, temperature at which the firing is conducted, etc.

Persons skilled in the art will also understand that this invention is applicable to other residues obtained in the same manner as in Example 1 wherein the proportion by weight of silver or silver halide (or mixtures of the two) present in the original contact mass is greater or less than that employed in the above examples. For example, the amount of silver in the silver-silicon mass, prior to passage of the hydrocarbon halide may comprise from as little as 2 per cent to as much as 50 per cent or more by weight of the total mass of silver and silicon.

One of the practical applications of our invention comprises recovering the silver in the form of silver nitrate from the residue resulting from the passage of a hydrocarbon halide over a contact mass comprising, for example, silicon and silver, and thereafter treating the said silver nitrate, either in the recovered or isolated state or in the form of the nitric acid solution from which substantially all the solid insoluble matter has been removed, with hydrogen chloride or hydrochloric acid to convert the silver nitrate to silver chloride. The silver chloride thus obtained may then be employed as a catalyst for effecting reaction between a hydrocarbon halide and the silicon component of a contact mass comprising silicon and the said silver chloride.

What we consider new and desire to secure by Letters Patent of the United States is:

1. The process which comprises (1) firing a residue obtained by passage of a hydrocarbon halide over a contact mass comprising (a) silicon and (b) a material selected from the class consisting of silver, silver halides, and mixtures of silver and silver halides at an elevated temperature, said firing taking place at a temperature above 600° C. in an atmosphere free of oxidizing agents, (2) thereafter treating the fired residue with strong nitric acid, and (3) recovering the formed silver nitrate.

2. The process which comprises (1) firing a residue obtained by passage of a hydrocarbon halide over a contact mass comprising (a) silicon and (b) silver at an elevated temperature, said firing taking place at a temperature above 600° C. in a non-oxidizing atmosphere, (2) thereafter treating the fired residue with concentrated nitric acid, and (3) recovering the formed silver nitrate.

3. The process which comprises (1) firing a residue obtained by passage of a hydrocarbon halide over a contact mass comprising (a) silicon and (b) a silver halide at an elevated temperature, said firing taking place at a temperature above 600° C. in a non-oxidizing atmosphere, (2) thereafter treating the fired residue with concentrated nitric acid, and (3) recovering the formed silver as nitrate.

4. The process which comprises (1) firing a residue obtained by passage of a halogenobenzene over a contact mass comprising silver and silicon at a temperature above 250° C., said firing taking place at a temperature above 600° C. in a non-oxidizing atmosphere, and (2) thereafter treating the fired residue with concentrated nitric acid and (3) isolating the silver nitrate thereby formed.

5. The process which comprises (1) firing a residue obtained by passage of chlorobenzene over a contact mass comprising silver and silicon at a temperature above 250° C., said firing taking place at a temperature above 600° C. in a hydrogen atmosphere, (2) thereafter treating the fired residue with concentrated nitric acid and (3) isolating the silver nitrate thereby formed.

6. The process which comprises (1) firing a residue obtained by passage of chlorobenzene over a contact mass comprising silver and silicon at a temperature above 250° C., said firing taking place at a temperature above 600° C. in a nitrogen atmosphere, (2) thereafter treating the fired residue with concentrated nitric acid and (3) isolating the silver nitrate thereby formed.

7. The process which comprises (1) firing a residue obtained by passage of chlorobenzene over a contact mass comprising silver and silicon at a temperature above 250° C., said firing taking place at a temperature above 600° C. in an atmosphere free of oxidizing agents, (2) thereafter treating the fired residue with concentrated nitric acid, (3) removing substantially all the undissolved portions from the nitric acid solution, (4) adding hydrochloric acid to the liquid nitric acid solution substantially free of solid matter to precipitate silver chloride, and (5) recovering the precipitated silver chloride.

HERMAN A. LIEBHAFSKY.
LESTER B. BRONK.

REFERENCES CITED

The following references are of record in the file of this patent:

UNITED STATES PATENTS

| Number | Name | Date |
| --- | --- | --- |
| 2,380,996 | Rochow et al. | Aug. 7, 1945 |
| 2,380,997 | Patnode | Aug. 7, 1945 |
| 2,380,998 | Sprung et al. | Aug. 7, 1945 |
| 2,380,999 | Sprung et al. | Aug. 7, 1945 |

OTHER REFERENCES

Mellor's, "Comprehensive Treatise on Inorganic and Theoretical Chemistry," vol. 3, Longmans, Green & Co., N. Y., publishers, pages 392, 398 and 459.